Jan. 28, 1958  A. WARMISHAM ET AL  2,821,108
DEEP-FIELD OPTICAL OBJECTIVES
Filed Feb. 4, 1954
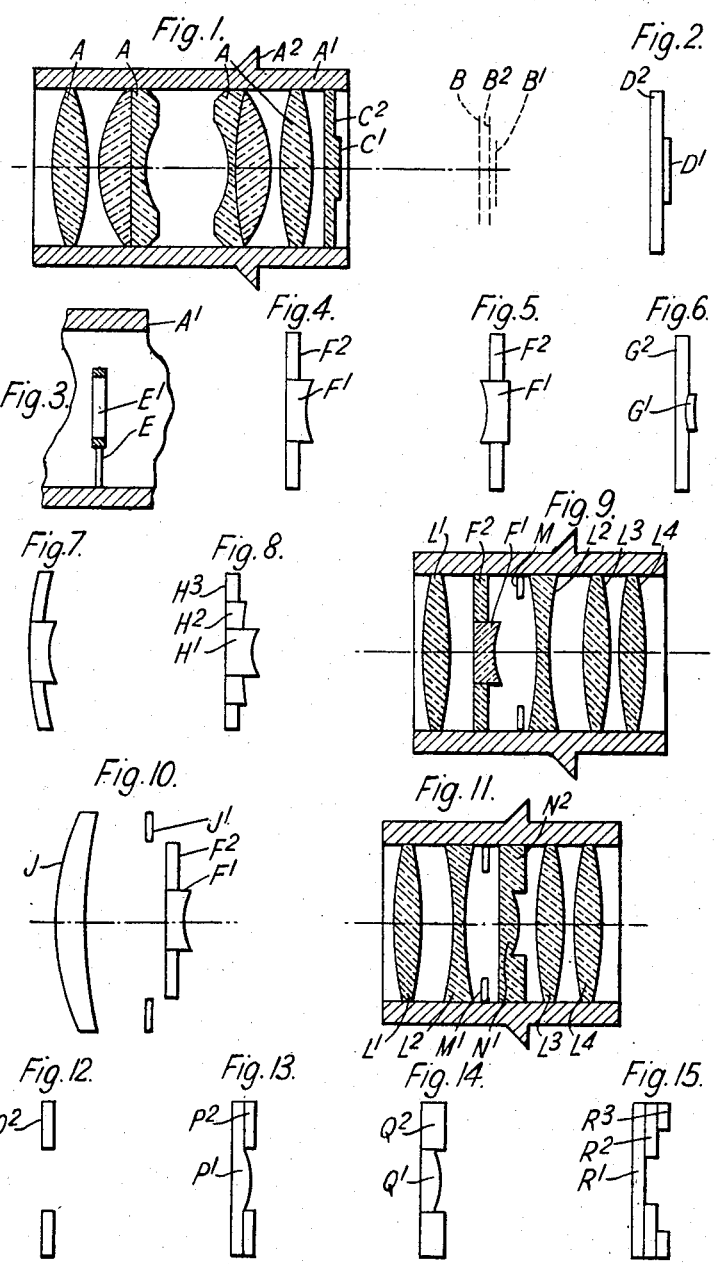
Inventor
Arthur Warmisham
Kenneth R. Coleman
By
Attorney

United States Patent Office 2,821,108
Patented Jan. 28, 1958

2,821,108
DEEP-FIELD OPTICAL OBJECTIVES

Arthur Warmisham and Kenneth Roy Coleman, Leicester, England, assignors to Taylor, Taylor & Hobson Limited, Leicester, England, a British company Application February 4, 1954, Serial No. 408,063

Claims priority, application Great Britain February 6, 1953

20 Claims. (Cl. 88—57)

This invention relates to optical objectives and is concerned with the provision of means whereby the apparent depth of focus of an objective can be increased.

It is already known that the depth of focus of an objective can be increased by dividing it up into zones which focus an object in different image planes, but prior proposals for doing this have used different effective focal lengths, and therefore, different magnifications, for the zones. This results in image doubling, with consequent blurring of the composite image.

The present invention has for its object to provide a simple and improved deep-field device, for incorporation in an objective, whereby such difficulty is avoided.

The deep-field device according to the invention comprises an approximately afocal member arranged to give different effective lengths for the ray paths of different parts of the image-forming beam, whereby the individual parts of the beam have approximately the same equivalent focal lengths but different flange back focal lengths, a part of higher numerical aperture being utilised for sharply focussing a nearer object on the image plane. The term "numerical aperture" is herein employed in its usual significance to denote the sine of the angle with the optical axis made by an emergent ray derived from an incident ray parallel to the axis. The term "flange back focal length" is herein employed in its usual significance to indicate the axial distance between the effective rear focal plane and a flange on the objective mount, by means of which the mount is located in its correct axial position.

The parts of the beam having different effective ray-path lengths are preferably segregated in concentric zones, the afocal member having different thicknesses in the different zones. In such case the thicknesses of the zones may increase outwardly from a central zone having the smallest thickness, the afocal member being located in a position at which the rays are diverging, but it will usually be preferable to adopt the converse arrangement with the zone thicknesses decreasing outwardly from a central zone having the greatest thickness, and to locate the afocal member in a position at which the rays are converging.

The distortion introduced by the afocal member may be approximately corrected by giving a slight curvature to one of the surfaces in at least one of the zones. Whilst such surface should theoretically be aspherical, it will usually suffice to employ a spherical curve of large radius approximating to such aspherical surface. This will result in giving slightly different equivalent focal lengths to the zones, but in practice such difference can be made smaller than 0.2 percent so that the effect can be neglected.

The afocal member may be constructed in various ways. Thus, it may consist of a single element, made of a single piece of transparent material moulded or ground to the appropriate shape, to have different thicknesses in different zones. In an alternative arrangement, the afocal member consists of a plurality of separate elements of different thickness concentrically fitted one within another. In such case, internal reflection at the contacting surfaces may be reduced by cementing the elements together with a cement having approximately the same mean refractive index as the elements which it connects.

In another arrangement, the afocal member includes an approximately plane-parallel plate with an additional element cemented to part of one surface of such plate. When there are three zones, there may be a further additional element cemented to part of the exposed surface of such additional element. In the case of a two-zone afocal member for use in a converging beam, the member may consist of an approximately plane-parallel plate having an additional element centrally cemented to one surface thereof, and in order to facilitate accurate centering the plate may have a spherically curved central depression, in which a correspondingly curved surface of the additional element is cemented. This alternative has the advantage that the materials of the plate and of the additional element may be chosen to have slightly different mean refractive indices to afford correction for the spherical and chromatic aberrations introduced by the greater thickness of the central zone.

When the afocal member has two zones, the outer diameter of the outer zone preferably lies between 1.5 and 6.0 times the diameter of the central zone. In the case of a three-zone member, the diameter of the central zone is preferably not less than one-tenth of the outer diameter of the outer zone.

The invention may be carried into practice in various ways, but some convenient alternative practical arrangements of deep-field device according to the invention are illustrated by the diagrammatic sketches in the accompanying drawings, in which Figure 1 shows a single construction constituting deep-field device mounted in the converging beam at the rear of an objective of the double Gauss type, Figures 2–8 illustrate various alternative constructions for use in converging beams, Figure 9 shows the construction of Figure 3 mounted in a converging beam within an objective of the modified Cooke triplet type, Figure 10 shows the same construction in use with a box camera objective, Figure 11 illustrates a deep-field device mounted in a diverging beam within an objective of the modified Cooke triplet type, and Figures 12–15 show various alternative constructions for use in diverging beams.

In Figure 1, a simple construction of deep-field device is shown as mounted on the rear side of an objective A of the double Gauss type, in the space betwen the rear surface of the objective and the normal back focal plane B thereof, the rays in this space converging towards the focal plane B. The mount of the objective A is diagrammatically indicated at $A^1$, with its locating flange at $A^2$, so that the normal flange back focal length of the objective (with the deep-field device omitted) is the axial distance from the flange $A^2$ to the back focal plane B.

The deep-field device itself, in this example, consists of a single piece of glass formed in two concentric zones $C^1$ and $C^2$, in each of which the device has the form of a plane-parallel plate, the thickness of the plate being greater in the central zone $C^1$ than in the annular outer zone $C^2$ surrounding it. One of the surfaces of the central zone may have a slight curvature for correcting aberrations due to its thickness without substantially afocal character, as hereinafter described. In general, the effect of a plane-parallel plate located in the convergent image space of an objective is to move the back focal plane of the objective further away from the objective by a distance dependent on the thickness of the plate, without altering the equivalent focal length so that the size of the image remains substantially unchanged. It will be clear therefore that the effect of the two-zoned plate $C^1C^2$ of this arrangement will be to cause the formation of two sharply focussed images of an infinitely distant object, of equal sizes, in two planes $B^1$ and $B^2$ differently spaced from the rear of the objective A, the image formed through the thicker central zone $C^1$ being further from the objective than that formed through the thinner outer zone $C^2$. Two sharply focussed images of equal size will also be formed in different planes of a nearer object, and it will be clear therefore that in a chosen image plane, sharply-focussed images of two objects at different distances will be superimposed on one another, the image of the more distant object being formed by the central zone $C^1$, which has lower numerical aperture than the outer zone $C^2$. Images of objects at other distances will also appear, less sharply focussed, in the same image plane.

It is well known that with any objective, having appreciable depth of focus, the images appearing in any one suitably chosen image plane will consist of a sharply focussed image of an object in the conjugate object plane together with less sharply focussed images of objects within a range of distances on either side of such conjugate object plane, the degree of sharpness of such images getting less and less the further the corresponding object position is from such conjugate object plane. When the two-zoned parallel plate $C^1C^2$ above described is added, there will be two sharply-focussed images in the chosen image plane, each having associated with it a range of less sharply-focussed images, and by suitable choice of the thicknesses of the two zones of the plate, it is possible to arrange that the two ranges of object distance within which images can be reasonably clearly seen can be made just to overlap, so that a reasonably clearly focussed image can be seen of all objects with the continuous range of distances embracing the two ranges just mentioned.

In practice, it will usually be desirable for the outer diameter of the outer zone $C^2$ of the plate to lie between 1.5 and 6.0 times the outer diameter of the central zone $C^1$. The lower portion of this range is preferable in those cases in which it is desired to retain the depth of focus even when the objective is stopped down to a relatively low aperture. In one convenient practical example, this diameter ratio has the value 3.25, the thickness of the outer zone $C^2$ of the plate being .043 F and that of the central zone $C^1$ .054 F where F is the equivalent focal length of the objective.

The displacement of the back focal plane B due to the addition of a plane-parallel plate of thickness $d$ is given by $(n-1)d/n$, where $n$ is the mean refractive index of the material of the plate. Thus, using glass of mean refractive index 1.613, the back focus displacement from B to $B^2$ due to the outer zone $C^2$ in the example above given amounts to .016 F and that from B to $B^1$ for the central zone $C^1$ to .021 F.

The simple arrangement above described does not take into account the aberrations introduced by the thickness of the plate, especially in the central zone, and in fact there is some degree of distortion introduced which does produce a certain amount of doubling of the image. This can be eliminated by providing an aspheric surface on the central zone $C^1$, but in practice it is found that by using a shallow spherical surface giving an approximation to the theoretically correct aspheric surface, quite good correction for the distortion can be obtained, thus reducing the image doubling to negligible proportions. This concave spherical surface for the central zone $C^1$ does involve a slight difference in equivalent focal length between the two zones, but in practice this difference can be kept low enough (say, less than 0.2 percent) to be negligible, whilst still giving adequate distortion correction. In the numerical example above given, a convenient radius for this spherical surface is 37 F. In some of the figures of the drawings the curvature has been shown greatly exaggerated, for purposes of illustration.

Instead of making the deep-field member of a single piece of glass, a similar effect can be obtained as shown in Figure 2 by cementing a central disc $D^1$, preferably with a slightly curved outer surface for distortion correction, to a plane-parallel plate $D^2$. Further, in some instances, it is practicable to reduce the thickness in the outer zone to zero, the central disc $E^1$ for the central zone being supported on a three-legged spider E, as shown in Figure 3, or being appropriately shaped and cemented to the rear surface of the objective A.

In another, especially convenient, arrangement, illustrated in two variants in Figures 4 and 5, the outer zone is formed by a plane-parallel annulus $F^2$ with a central hole, into which a thicker plug $F^1$ is fitted to form the central zone. One of the surfaces of the plug $F^1$ is preferably curved to provide correction for distortion in the manner above described, and Figures 4 and 5 differ from one another in that in one the curvature is on the rear surface and in the other it is on the front surface. In order to avoid obstruction and interference with the image formation due to internal reflection at the surface of contact between the plug and the annulus, it is preferable to polish the two contacting surfaces and to secure them together by means of a cement so chosen that the mean refractive indices of the cement and the two pieces of glass are approximately the same.

Figure 6 shows another arrangement, which may be regarded as a modification of the arrangement of Figure 2 to facilitate accurate centering of the additional disc. In this arrangement, a plane parallel plate $G^2$ is provided with a shallow central depression having a concave spherical surface, and a central disc $G^1$ has a correspondingly curved surface to be cemented in the depression in the plate $G^2$. This arrangement has the further advantage that by using for the central disc $G^1$ a material having slightly different mean refractive index from that of the material of the main plate $G^2$ (the index difference being less than, say, .09) it becomes possible also to correct the slight spherical and chromatic aberrations introduced by the thickness of the disc $G^1$.

In one convenient example of such arrangement, wherein the numerical aperture in the central zone is arranged to be approximately one-seventh, the thickness of the plane-parallel plate $G^2$ in the outer zone is .043 F and the total thickness in the central zone is .054 F. The material used for the plate $G^2$ has mean refractive index 1.572 and Abbé V number 57.7, whilst that used for the additional element $G^1$ has mean refractive index 1.612 and Abbé V number 44.9. The radius of curvature of the cemented surface between the element and the plate is 8 F, and the radius of curvature of the air-exposed rear surface of the additional element is 30 F (the additional element being cemented to the rear surface of the plane-parallel plate), both such surfaces being convex to the front.

Whilst, in the foregoing arrangements, the afocal member has been described as having plane-parallel zones (except for the slight curvature provided for distortion correction), it will be appreciated that the member may be subjected to what is commonly known as "bending," that is by adding the same amount of curvature to each of the surfaces, as diagrammatically indicated by way of example for the arrangement of Figure 4 in Figure 7.

The depth of focus obtained from the two-zone afocal member above described can be increased, if desired, by increasing the number of zones of different thickness. Thus, for example, Figure 8 shows a three-zone arrangement, analogous to the arrangement of Figure 4, having a central plug $H^1$ within an annulus $H^2$ which is in turn within an annulus $H^3$. In one convenient example of such arrangement, the outer diameters of the three zones may be in the ratios 3:2:1, and the thickness of the outer, intermediate and central zones may respectively be .043 F, .054 F and .063 F. For distortion correction, in such example, the surface of the central zone may have radius of curvature 20 F and that of the intermediate zone 37 F. In general, in a three-zone arrangement it is preferable for the diameter of the central zone to be not less than one-tenth of the overall diameter of the afocal member.

In all the foregoing arrangements, the afocal member has been assumed to be located in the converging space behind the rear surface of the objective, but it should be mentioned that it is desirable for the member to be located as near the optical stop of the objective as is practicable. This will usually mean in practice that the afocal member is located immediately next to the rear surface of the objective (as for example in the arrangement of Figure 10, wherein the afocal member $F^1F^2$ of Figure 4 is located adjacent to the stop $J^1$ of a box camera objective J), but in cases where the stop happens to be located in a space within the objective where the rays are converging, a good position for the afocal member would be close against such stop. Thus, Figure 9 shows an objective of the modified Cooke triplet type having a simple divergent component $L^2$ located behind a simple convergent component $L^1$ and in front of two simple convergent components $L^3L^4$, corrected with respect to a stop M in the space between the front two components $L^1L^2$, where the rays are converging, the afocal member $F^1F^2$ (shown by way of example as of the kind illustrated in Figure 4) being located adjacent to the stop M.

It is not essential to the invention for the afocal member to be located in a space in which the rays are converging, and Figure 11 shows an objective $L^1L^2L^3L^4$ similar to that of Figure 9 except that the stop $M^1$, with respect to which the objective is corrected, lies in the space between the components $L^2$ and $L^3$, where the rays are diverging. In this example, the afocal member is located adjacent to the stop $M^1$, but since the rays in this space are diverging, it is necessary that the central zone of the member should have the smallest thickness. In the example illustrated, the afocal member is made of a single piece of glass having its central zone $N^1$ of smaller thickness than the outer zone $N^2$, and to correct for the distortion error the surface of the central zone $N^1$ is given a convex curvature.

The construction of the afocal member, when used in a diverging beam, may vary in a manner analogous to the variations described with reference to Figures 2–8 for a member used in a converging beam, and some variants are shown by way of example in Figures 12–15. Thus, Figure 12 shows the afocal member in the form of a simple annulus $O^2$ of thickness suited to a central zone of zero thickness. In Figure 13 the afocal member consists of a plane-parallel plate $P^1$ having an annulus $P^2$ cemented to it, the central zone within such annulus being chosen as having a convexly curved surface to give distortion correction. In Figure 14, a central plug $Q^1$ is cemented within the central hole in an annulus $Q^2$ of greater thickness. Figure 15 shows one example of a three-zone arrangement consisting of a plate $R^1$ having an annulus $R^2$ cemented to it, with a further annulus $R^3$ cemented to the annulus $R^2$.

It will be apparent that there are many other possible variants of the construction of afocal member, within the scope of the invention, whether used in a converging beam or in a diverging beam.

It should be mentioned that in the various figures of the drawings which show a surface of the afocal member curved to give correction for distortion, the actual curvatures shown are greatly exaggerated for the sake of clearness.

What we claim as our invention and desire to secure by Letters Patent is:

1. A deep-field device for an optical objective comprising, in combination with the objective, an approximately afocal light transmitting member located on the optical axis of the objective at a distance remote from the image plane where there is negligible zonal segregation of the field rays, said afocal member comprising a plurality of concentric zones of different thicknesses, each individual zone being of substantially uniform thickness, the surfaces of at least one of said zones departing from an exact parallelism only to the extent of a slight curvature serving to correct at least in part the distortion introduced by said afocal member, the optical power of any such zone thus curved on its surface being less than three percent of the power of the whole objective, whereby the image forming beam passing through the objective consists of individual parts passing respectively through the individual zones of the afocal member and having different effective ray-path lengths with substantially the same equivalent focal lengths but different flange back focal lengths, thereby producing a composite image comprising superposed sharply defined images having the same magnifications of at least two object planes at different distances in the field of view.

2. A deep-field device as claimed in claim 1, in which the afocal member has two zones, the outer diameter of the outer zone lying between 1.5 and 6.0 times the diameter of the central zone.

3. A deep-field device as claimed in claim 1, in which the afocal member has three zones, the diameter of the central zone being not less than one-tenth of the outer diameter of the outer zone.

4. A deep-field device for an optical objective comprising a substantially afocal light transmitting member having concentric zones of different thicknesses, whereby the individual parts of the image forming beam passing through the objective and through the individual zones of the afocal member have different effective ray-path lengths and thus have approximately the same equivalent focal lengths but different flange back focal lengths, the distortion introduced by the afocal member being approximately corrected by one of the surfaces of at least one of the zones of the afocal member having a slight curvature, in which the afocal member consists of a plurality of separate transparent elements of different thickness concentrically fitted one within another.

5. A deep-field device as claimed in claim 4, in which the elements of the afocal member are secured together by cement having approximately the same mean refractive index as the elements which it connects.

6. A deep-field device as claimed in claim 5, in which the afocal member has two zones, the outer diameter of the outer zone lying between 1.5 and 6.0 times the diameter of the central zone.

7. A deep-field device as claimed in claim 4, in which the afocal member has three zones, the diameter of the central zone being not less than one-tenth of the outer diameter of the outer zone.

8. A deep-field device as claimed in claim 1, in which the afocal member includes an approximately plane-parallel plate of transparent material, and an additional transparent element cemented to part of one surface of such plate.

9. A deep-field device as claimed in claim 8, in which the afocal member has two zones, the outer diameter of the outer zone lying between 1.5 and 6.0 times the diameter of the central zone.

10. A deep-field device as claimed in claim 1, in which the afocal member consists of a single piece of transparent material having different thicknesses in different concentric zones.

11. A deep-field device as claimed in claim 10, in which the afocal member has two zones, the outer diameter of the outer zone lying between 1.5 and 6.0 times the diameter of the central zone.

12. A deep-field device as claimed in claim 1, in which the thicknesses of the zones of the afocal member increase outwardly from a central zone having the smallest thickness, the member being located in a position in which the rays are diverging.

13. A deep-field device for an optical objective comprising, in combination with the objective, a substantially afocal light transmitting member located on the optical axis of the objective remote from the image plane at a distance from the objective where the field rays are converging and there is negligible zonal segregation thereof, said afocal light transmitting member having concentric zones whose thicknesses decrease outwardly from a central zone having the greatest thickness, whereby the individual parts of the image forming beam passing through the objective and through the respective zones of the light transmitting member have different effective ray-path lengths and substantially the same equivalent focal lengths but different flange back focal lengths, the surfaces of at least one of said zones departing from exact parallelism only to the extent required for adequate correction of the distortion otherwise caused by said light transmitting member, the optical power of any such zone with non-parallel surfaces being not over 3% of the optical power of the objective as a whole.

14. A deep-field device for an optical objective, comprising in combination with the objective, a substantially afocal light transmitting member located in a position remote from the image plane of the objective where there is negligible zonal segregation of the field rays and where these rays are converging, said afocal member having concentric zones whose thicknesses decrease outwardly from a central zone having a greater thickness, whereby the individual parts of the image-forming beam passing through the objective and through the individual zones of the afocal member have different effective ray-path lengths and thus have approximately the same equivalent focal lengths but different flange back focal lengths, the distortion introduced by the afocal member being approximately corrected by one of the surfaces in at least one of the zones of the afocal member having a slight curvature, in which the afocal member has two zones, the outer diameter of the outer zone lying between 1.5 and 6.0 times the diameter of the central zone.

15. A deep-field device as claimed in claim 14, in which the afocal member consists of an approximately plane-parallel plate, and an additional element centrally cemented to one surface thereof.

16. A deep-field device as claimed in claim 14, in which the afocal member consists of an approximately plane-parallel plate having a spherically curved depression on one face covering the central zone, and an additional element having a correspondingly curved surface cemented to the plate in the depression.

17. A deep-field device as claimed in claim 16, in which the mean refractive indices of the materials of the plate and of the additional element differ slightly to afford correction for the spherical and chromatic aberrations introduced by the greater thickness of the central zone.

18. A deep-field device as claimed in claim 14, in which the afocal member consists of an annular plane-parallel plate having a central opening, and an additional element of greater thickness than the plate fitted within such central opening.

19. A deep-field device as claimed in claim 13, in which the afocal member has three zones, the diameter of the central zone being not less than one-tenth of the outer diameter of the outer zone.

20. A deep-field device as claimed in claim 1, in which the position of the afocal member is such that the pencil of rays to each point of the image field embraces the axial points within the afocal member, a zone of low numerical aperture and a zone of high numerical aperture respectively being utilised for sharply focussing a distant object and a near object in the same image plane.

References Cited in the file of this patent

UNITED STATES PATENTS

| | | |
|---|---|---|
| 2,332,930 | Rinia | Oct. 26, 1943 |
| 2,377,268 | Rinia | May 29, 1945 |
| 2,546,995 | Garusto | Apr. 3, 1951 |
| 2,546,996 | Garusto | Apr. 3, 1951 |
| 2,550,685 | Garusto | May 1, 1951 |

FOREIGN PATENTS

| | | |
|---|---|---|
| 11,140 | France | Oct. 26, 1909 |
| | (1st Addition to No. 394,514) | |
| 354,420 | Germany | June 9, 1922 |
| 373,755 | Germany | Apr. 16, 1923 |
| 622,100 | France | Feb. 19, 1927 |
| 335,696 | Great Britain | Oct. 2, 1930 |
| 746,480 | Great Britain | Mar. 14, 1956 |